(12) United States Patent
Schumacher

(10) Patent No.: US 6,413,422 B1
(45) Date of Patent: Jul. 2, 2002

(54) CANDLE FILTER ELEMENTS AND METHOD FOR FIXING SAME IN A PRESSURE VESSEL

(75) Inventor: Ivo Schumacher, Zuercherstrasse (CH)

(73) Assignee: DRM, Dr. Mueller AG, Maennedorf (CH)

( * ) Notice: Subject to any disclaimer, the term of this patent is extended or adjusted under 35 U.S.C. 154(b) by 0 days.

(21) Appl. No.: 09/744,486

(22) PCT Filed: Jul. 16, 1999

(86) PCT No.: PCT/CH99/00326

§ 371 (c)(1),
(2), (4) Date: Jan. 24, 2001

(87) PCT Pub. No.: WO00/06281

PCT Pub. Date: Feb. 10, 2000

(30) Foreign Application Priority Data

Jul. 25, 1998 (CH) .................................................. 1572/98

(51) Int. Cl.⁷ ................................................ B01D 27/00
(52) U.S. Cl. ..................... 210/232; 210/323.2; 210/444; 210/497.3
(58) Field of Search .............................. 210/232, 323.2, 210/444, 497.01, 497.3

(56) References Cited

U.S. PATENT DOCUMENTS

| 3,934,906 A | | 1/1976 | Shippey | |
|---|---|---|---|---|
| 4,859,328 A | * | 8/1989 | Groezinger et al. | ........ 210/232 |
| 4,915,831 A | * | 4/1990 | Taylor | ........................ 210/232 |

FOREIGN PATENT DOCUMENTS

| CH | 660 850 A | 5/1987 |
|---|---|---|
| DE | 41 30 593 A | 3/1993 |
| EP | 0 249 395 A | 12/1987 |
| FR | 2 127 360 A | 10/1972 |
| WO | 94/23819 | 10/1994 |

* cited by examiner

Primary Examiner—Robert J. Popovics
(74) Attorney, Agent, or Firm—Michael J. Striker

(57) ABSTRACT

A candle filter element adapted to be located inside a pressure vessel and fixed in a hanging position to a collector tube for aseptic and/or sterile filtration of liquids, has a coupling with conical upper coupling part and a conical lower coupling part, with the conical upper coupling part provided with a rinsing opening and a pair of cams.

3 Claims, 2 Drawing Sheets

CANDLE FILTER ELEMENTS AND METHOD FOR FIXING SAME IN A PRESSURE VESSEL

BACKGROUND OF THE INVENTION

The invention relates to candle filter elements which are fixed in a hanging position to a collector tube inside a pressure vessel for the aseptic and/or sterile filtration of liquids, including a coupling with a conical upper coupling part, a conical lower coupling part, and a part of cams.

One candle filter element of this type which is suitable for sterile filtration in a pressure vessel is known from WO 94/23819. In order to clean the filter elements, one can remove the central tube serving as a support body without having to open the filter container. The couplings used can only be sterilized internally in place, and cannot be properly cleaned without dismantling.

Besides screw-type fasteners, quick-acting fasteners are also used for fixing candle filter elements. For instance, CH-A 660850 describes one such quick-acting fastener which is suitable for filtration of radioactive effluents and which enables the filter elements to be exchanged easily by means of a turn-lock fastener. However, such a fastener is not suitable for aseptic or sterile use.

SUMMARY OF THE INVENTION

The problem of the invention is to make available a device for connecting pressurized filter elements in a pressure vessel that is suitable for aseptic or sterile use.

In accordance with the invention this problem is solved by providing a rinse opening between the upper coupling part, the lower coupling part and the cams.

The essential advantage is that one coupling part is provided with rinse openings so that the cavities between the opposing internal surfaces of the two coupling parts can be rinsed with CIP liquid and/or sterilized with steam.

The coupling parts are connected in an advantageous manner by being turned relatively to each other so that fastening cams and opposing cams engage in each other and the sealing faces are pressed against each other by a rising pitch on the fastening cams or opposing cams.

As a connection for elements with a vertical axis, both coupling parts are made with a conical shape, to allow liquid to drain out of the interstices. Owing to the conical shape, the sealing faces are located close to the bore of the tube. They have the smallest possible cross-section which is provided for the connection required cross-section rinse openings and has no surfaces in direct contact with each other apart from the bearing points of the cams. The connection requires at least two pairs of cams, and preferably three.

As a coupling for filter elements, it is an advantage for the connecting cams to be located on a large diameter so that the lever arm to sustain forces acting radially on the filter elements is as large as possible. Either cam (upper or lower) may be the larger of the two.

The cam may be pressed axially by the lower coupling part and/or by the upper coupling part. The rising pitch must be selected so that axial pressure is brought to bear on the seal.

In a variant, the seal can be arranged so that it also seals radially, so that none of the cams need have a rising pitch.

It is convenient to provide a fixed dip tube, in other words a dip tube that is not freely rotatable.

BRIEF DESCRIPTION OF THE DRAWINGS

The invention will be described in detail with reference to a drawing, in which.

DESCRIPTION OF THE PREFERRED EMBODIMENTS

Figure 1:
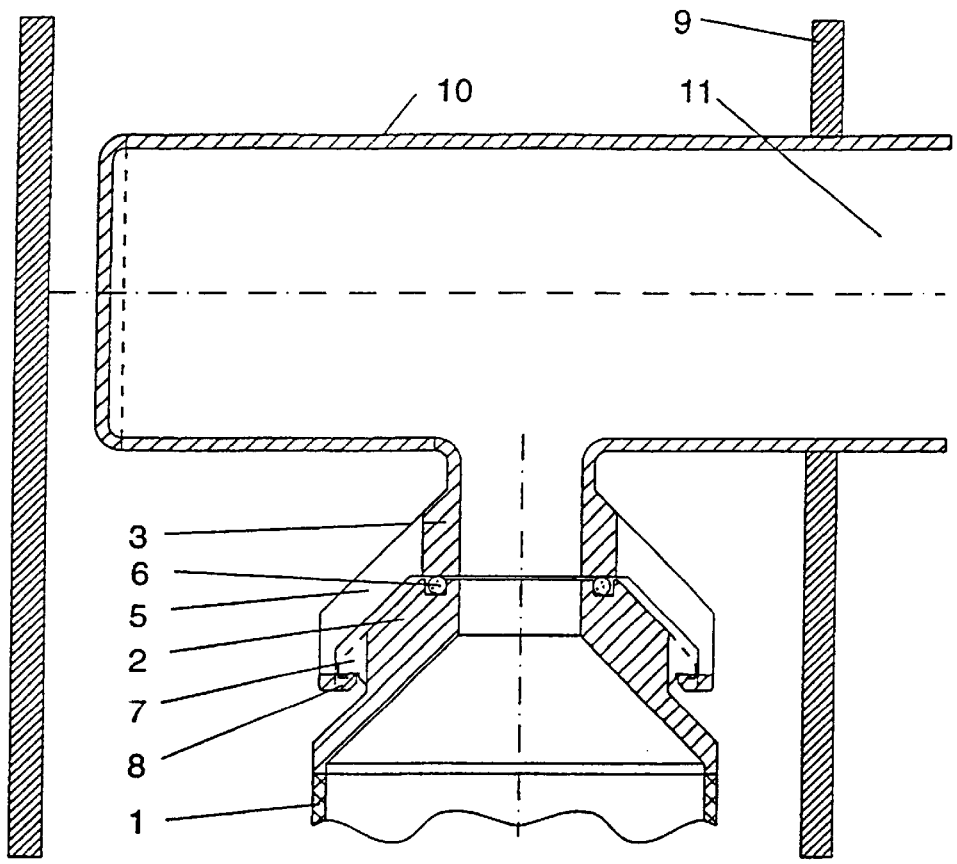
FIG. 1 is a general view schematically showing a filter casing with a filter element connected to a collector tube

In FIG. 1 the reference number 1 denotes a filter element. The filter element 1 is attached to a lower coupling part 2 in a known manner. The lower coupling part 2 and an upper coupling part 3 form a cavity, designated the dip tube 4. An opening is formed between the coupling part 2 and the coupling part 3 as a rinsing space 5. The coupling part 2 is connected to the coupling part 3 via a seal ring 6. Fastening cams 7, 7', 7" are provided on the coupling part 2, and fastening cams 8, 8', 8" are provided on the coupling part 3. The dip tube 4 communicates with a collector tube 10 with a filtrate outlet 11, mounted in a pressure vessel 9.

Figure 2:
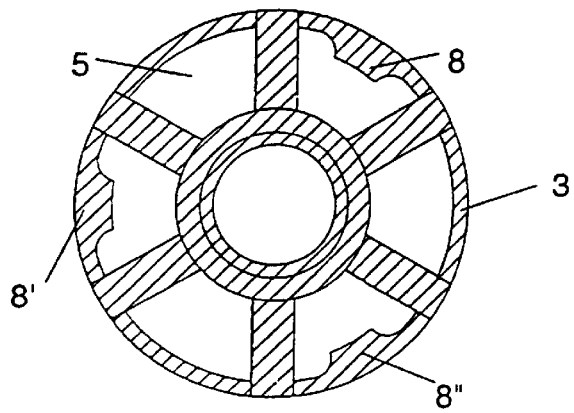
FIG. 2 shows a plan view of the upper coupling part

In FIG. 2 of the lower coupling part 2 is shown in plan view, with fastening cams 8, 8', 8" and rinse opening 5.

Figure 3:
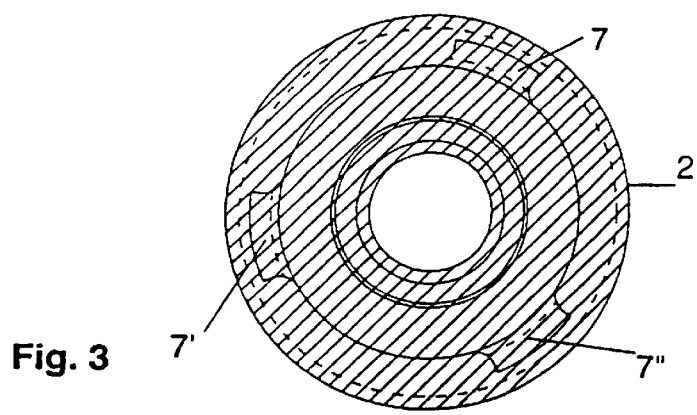
FIG. 3 shows a plan view of the lower coupling part

In FIG. 3 the lower coupling part 2 is shown in plan view, with fastening cams 7, 7', 7".

Figure 4:
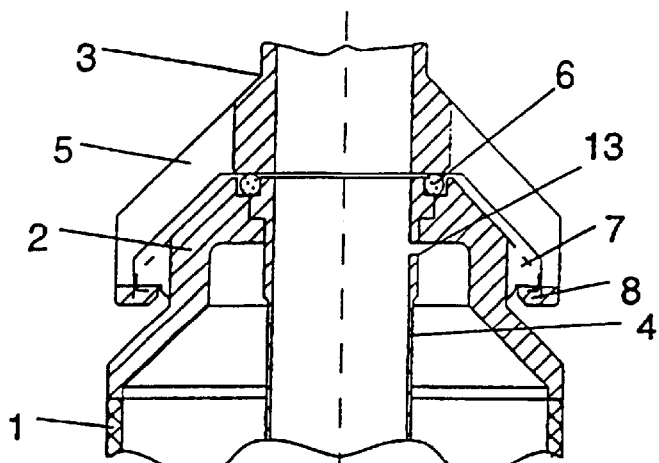
FIG. 4 is a general elevation showing filter element, lower coupling part, upper coupling part, filtrate discharge tube and seal

FIG. 4 shows a variant of the fixing according to the invention with an extended dip tube 4 leading into the filter element 1. The dip tube is provided with a vent hole 13.

Figure 5:
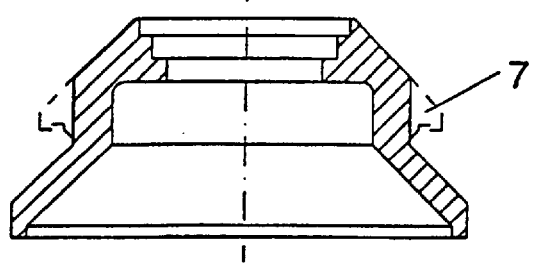
FIG. 5 is a general elevation of the lower coupling part, with fastening cams

FIG. 5 shows a plan view of the lower coupling part 2 with the fastening cam 7.

Figure 6:
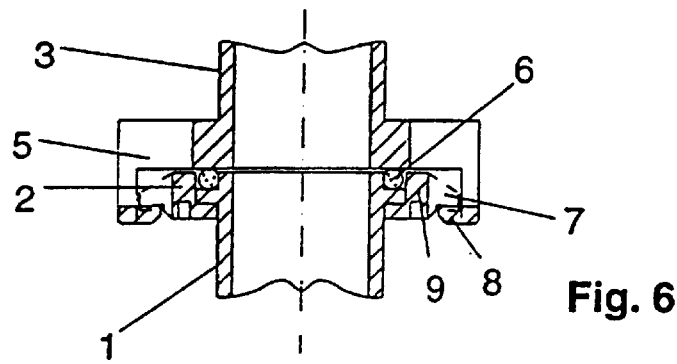
FIG. 6 shows the connecting principle when used as coupling for non freely rotatable parts
Figure 7:
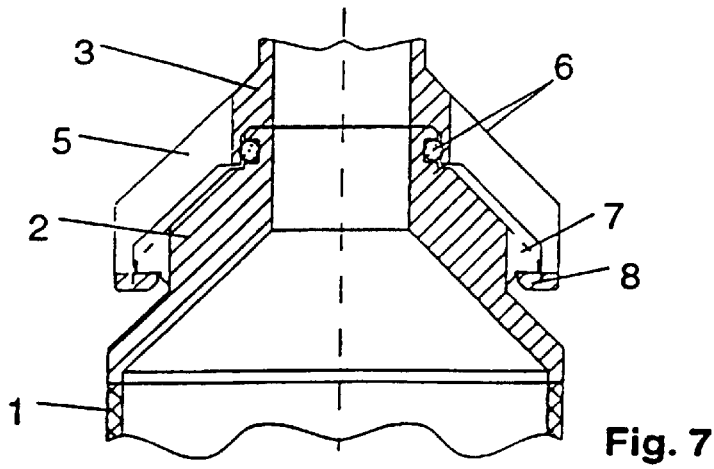
FIG. 7 shows the connecting principle when used as coupling with radial seal, without rising pitch on the cams.

FIG. 6 shows a further variant of the fixing according to the invention, for non freely rotatable parts FIG. 7 shows a further variant of the fixing according to the invention, without rising pitch on the cams.

As a coupling for filter elements, it is an advantage for the connecting cams to be located on a large diameter so that the lever arm to sustain forces acting radially on the filter elements is as large as possible.

For the seal, there are two possible variants:

A) axial, with cams formed for jamming action

B) radial, with cams acting as connection only

Variant "A" has the advantage over Variant "B" that the surface area in the region of the seal can be kept smaller, and no labyrinth is formed that could act as a trap for CIP liquids.

What is claimed is:

1. A candle filter element adapted to be located inside a pressure vessel and fixed in a hanging position to a collector tube for aseptic and/or sterile filtration of liquids, the candle filter element comprising a coupling with a conical upper coupling part and a conical lower coupling part; said conical upper coupling part has a rinsing opening and at least two pairs of cams.

2. A candle filter element as defined in claim 1, wherein said cams include a cam which is pressed axially against at least one of the said parts.

3. A candle filter element as defined in claim 1, wherein said cams include a cam which is pressed radially against at least one of said parts.

* * * * *